United States Patent [19]

Keane et al.

[11] Patent Number: 5,590,264
[45] Date of Patent: Dec. 31, 1996

[54] METHOD AND APPARATUS FOR GRAPHIC ASSOCIATION OF USER DIALOG DISPLAYS WITH PRIMARY APPLICATIONS IN A DATA PROCESSING SYSTEM

[75] Inventors: Patrick J. Keane, Grapevine, Tex.; Justin J. C. Richards, Warwick, United Kingdom

[73] Assignee: International Business Machines Corporation, Armonk, N.Y.

[21] Appl. No.: 683,381

[22] Filed: Apr. 10, 1991

[51] Int. Cl.⁶ ........................................ G06F 3/00
[52] U.S. Cl. ........................... 395/340; 395/348
[58] Field of Search .................... 395/155–161, 395/154; 340/706, 703, 721, 723; 345/118–119

[56] References Cited

U.S. PATENT DOCUMENTS

| | | | |
|---|---|---|---|
| 4,899,136 | 2/1990 | Beard et al. | 340/706 |
| 4,931,783 | 6/1990 | Atkinson | 395/156 |
| 5,001,697 | 3/1991 | Torres | 395/157 |
| 5,025,395 | 6/1991 | Nose et al. | 395/275 |
| 5,060,135 | 10/1991 | Levine et al. | 395/159 X |
| 5,065,347 | 11/1991 | Pajak et al. | 395/159 |
| 5,122,972 | 6/1992 | Richards et al. | 395/157 |
| 5,140,677 | 8/1992 | Fleming et al. | 395/159 |
| 5,140,678 | 8/1992 | Torres | 395/159 |
| 5,230,783 | 7/1993 | Hoeber et al. | 395/156 |

OTHER PUBLICATIONS

*Microsoft Windows User's Guide* v. 3.0, Microsoft Corp., 1990, pp. 5–76.

Systems Application Architecture, Common User Access: Advanced Interface Design Guide, IBM, Jun. 1989, pp. 15, 20–21, 77–91, 102–115.

*Primary Examiner*—Mark R. Powell
*Assistant Examiner*—John E. Breene
*Attorney, Agent, or Firm*—Edward H. Duffield; Andrew J. Dillon

[57] ABSTRACT

A method and apparatus for the graphic association of a user dialog display with its primary application in a data processing system. A unique miniature graphic representation, or icon, is created for each primary application within a data processing system which has a plurality of primary applications simultaneously active therein. Thereafter, each time a user dialog for a selected primary application is displayed within a window, a copy of the unique miniature graphic representation of the selected primary application is displayed, in a normally unused portion of the user dialog window, thereby permitting a user to readily identify the association between the user dialog window and its underlying primary application. In a depicted embodiment of the present invention, the selection of a unique miniature graphic representation within a user dialog window, utilizing a graphic pointing device, will result in the creation of a textual display identifying the primary application by name.

5 Claims, 3 Drawing Sheets

METHOD AND APPARATUS FOR GRAPHIC ASSOCIATION OF USER DIALOG DISPLAYS WITH PRIMARY APPLICATIONS IN A DATA PROCESSING SYSTEM

CROSS-REFERENCE TO RELATED APPLICATION

The present application is related to U.S. patent application Ser. No. 07/522,300, filed May 11, 1990, entitled "Computer User Interface with Window Title Bar Mini-Icons," assigned to the Assignee herein, and including a common inventor with the present application. That application is incorporated herein by reference thereto.

BACKGROUND OF THE INVENTION

1. Technical Field

The present invention relates in general to computer system user interfaces and in particular to computer systems which permit multiple simultaneously active applications to be displayed in a plurality of windows. Still more particularly, the present invention relates to a method and apparatus for graphically associating a user dialog display with an associated primary application in a computer system.

2. Description of the Related Art

Modern state-of-the-art computer systems are more commonly utilizing so-called Graphical User Interfaces (GUI) to enhance the usability of such computer systems and provide a natural interface between a complex computer system and a user. As faster and more powerful processors and larger color capable display systems are becoming available for computer systems, the graphical user interface approach is rapidly changing.

One change which is increasing the power of computer systems utilizing this technique is the simultaneous display of multiple computer applications in viewports or windows which are simultaneously active. Most current computer systems which operate in a so-called window mode permit multiple applications to be simultaneously output active while only the uppermost window is input active. However, as processors become more powerful and display systems are enhanced to permit more detailed graphic displays computer systems are achieving the more flexible "all windows active" mode of operation in which all computer applications displayed within windows are not only output active but also simultaneously input active, without requiring each window to be uppermost within the display in order to receive inputs.

Another change which the enhanced power of modern computer systems makes possible is the increased utilization of "user dialogs," or pop-up windows which are used by computer applications to gather additional information from users. Examples of common user dialog windows are "file open," "file save," "file print," "font selection," "color selection," and "page setup." The increased utilization of such user dialog windows has resulted in an attempt by modern computer system architects to utilize common dialogs wherever possible. That is, the "page setup" user dialog for all applications within a particular system will be identical.

Modern interface design for graphical user interface systems also attempts wherever possible to avoid modality, or modes in an application. A mode is typically defined as an application state which must be cancelled before a user can perform another action. In the area of user dialogs, many current user dialogs are modal. That is, if the "file open" dialog is open by a particular application, the user may not interact with that application or its data file until the user dialog is submitted or cancelled.

As the user interface architecture described above moves toward these environmental goals, user dialogs will increasingly have so-called "permanence" on the screen. It should therefore be apparent that a need exists for a method which may be utilized to associate a particular user dialog with the primary application that "owns" the user dialog or is associated therewith.

SUMMARY OF THE INVENTION

It is therefore one object of the present invention to provide an improved computer system user interface.

It is another object of the present invention to provide an improved computer system which permits multiple simultaneously active applications to be displayed in a plurality of windows.

It is yet another object of the present invention to provide an improved computer system which provides a method and apparatus for graphically associating a user dialog display with an associated primary application.

The foregoing objects are achieved as is now described. The method and apparatus of the present invention provides for the graphic association of a user dialog display with its primary application in a data processing system. A unique miniature graphic representation, or icon, is created for each primary application within a data processing system which has a plurality of primary applications simultaneously active therein. Thereafter, each time a user dialog for a selected primary application is displayed within a window, a copy of the unique miniature graphic representation of the selected primary application is displayed, in a normally unused portion of the user dialog window, thereby permitting a user to readily identify the association between the user dialog window and its underlying primary application. In a depicted embodiment of the present invention, the graphic selection of a unique miniature graphic representation within a user dialog window, by means of a graphic pointing device, will result in the temporary creation of a textual display identifying the primary application by name.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
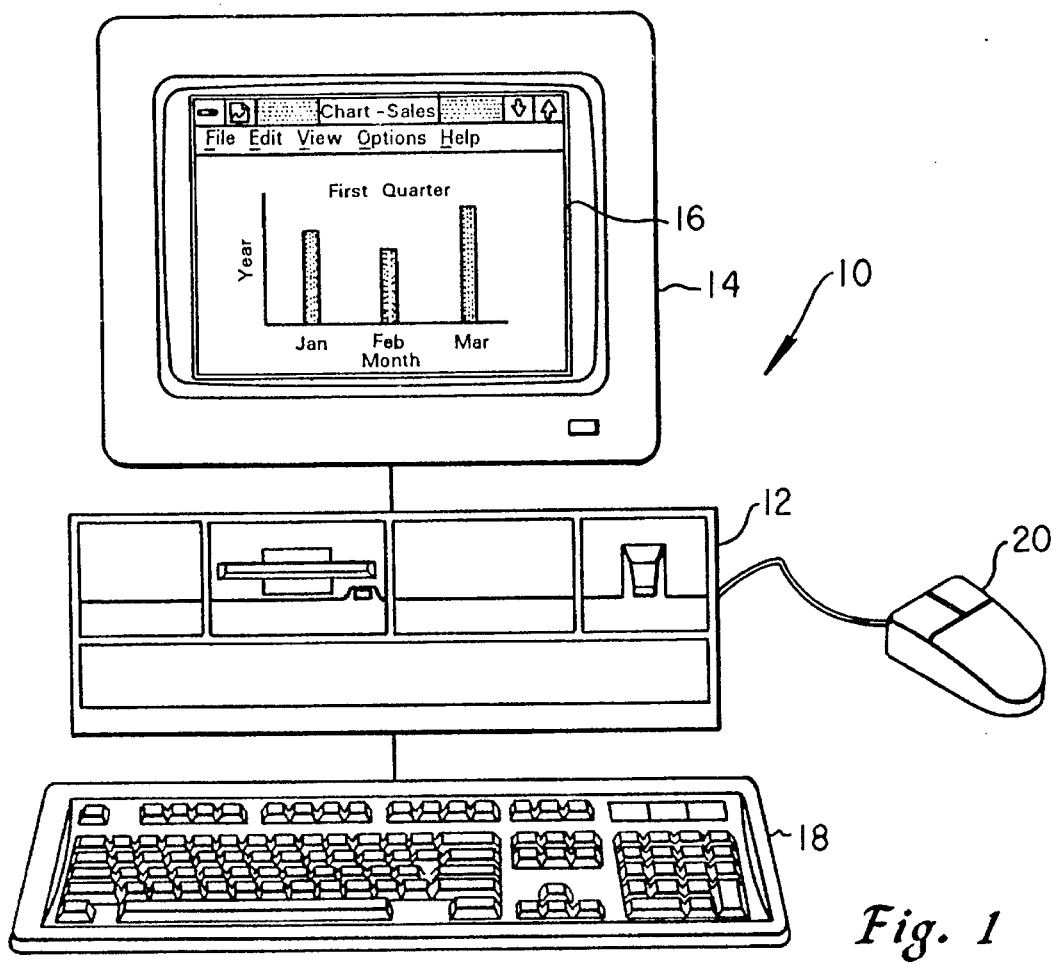
FIG. 1 is a pictorial representation of a computer system displaying a computer application within a display window.

With reference now to the figures and in particular with reference to FIG. 1, there is depicted a computer system 10. Computer system 10 may be implemented utilizing any suitable personal computer, such as the IBM PS/2 Personal Computer manufactured by International Business Machines Corporation of Armonk, N.Y.

As is illustrated, computer system 10 includes a processor 12 and a display system 14 coupled thereto. Depicted within display system 14 is display screen 16 which illustrates the graphic presentation of a computer application within a viewport or window, in a manner well known in the art. Depicted within display screen 16 is a computer application for developing a sales chart. Also, coupled to processor 12 is keyboard 18 which is utilized, in a manner well known in the art, to permit a user to enter data and control the operation of computer system 10. Also coupled to processor 12 is graphical pointing device 20. Graphical pointing device 20, in the depicted embodiment of the present invention, comprises a "mouse"; however, those skilled in the art that any suitable graphical pointing device, such as a light pen may also be utilized in accordance with the method and apparatus of the present invention.

Figure 2:
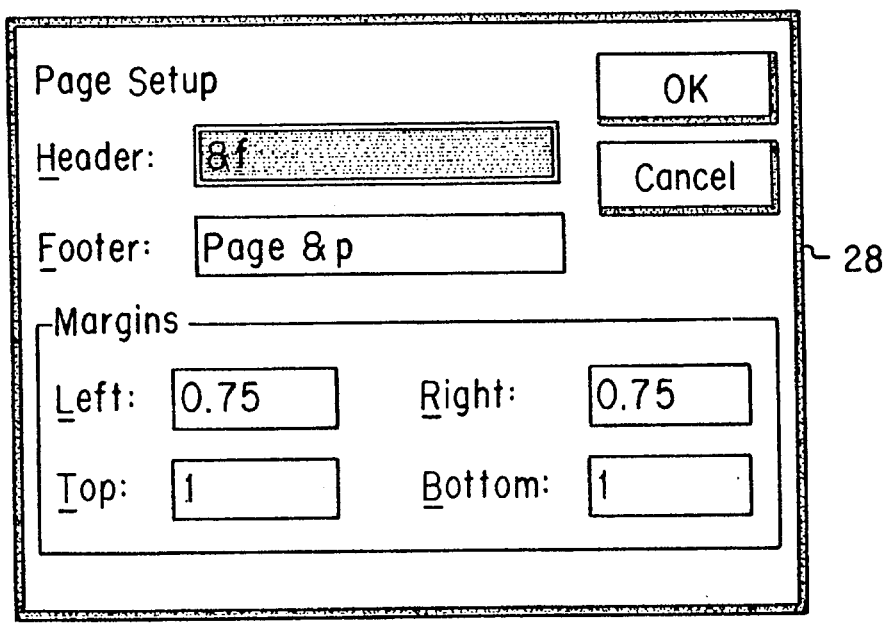
FIG. 2 is a pictorial representation of a PAGE SETUP user dialog window which may be utilized with the computer application of FIG. 1.

Referring now to FIG. 2, there is depicted a pictorial representation of a PAGE SETUP user dialog window 26 which may be utilized with the computer application of FIG. 1. As illustrated, user dialog window 26 typically represents a so-called "pop-up" window which may be displayed at any point within display screen 16 to enable a user to engage in a so-called "dialog" with a computer application in order to enter data or specify selected default conditions for some portion of the computer application. PAGE SETUP user dialog window 26, as illustrated, may be utilized to specify a header, footer, and margins for an output page which is provided by the computer application displayed above. Of course, those skilled in the art will appreciate that a PAGE SETUP user dialog window such as that depicted at reference numeral 26 may be utilized with any number of different computer applications all of which are capable of generating output in a page format.

Figure 3:
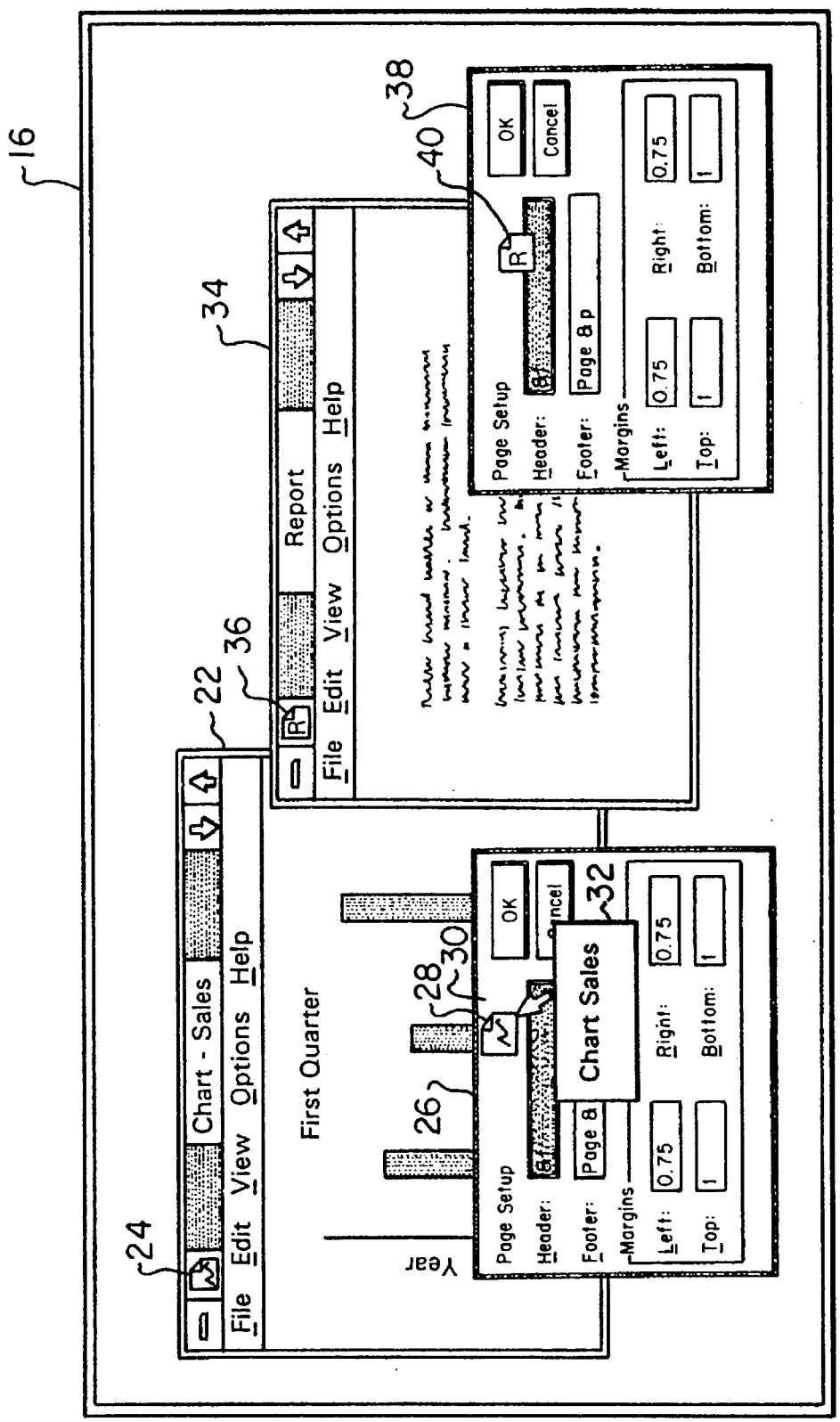
FIG. 3 is a pictorial representation of a computer display including two simultaneously active computer applications and two substantially identical user dialog windows.

With reference now to FIG. 3, there is depicted a pictorial representation of a computer display screen 16 which includes two computer applications and two substantially identical user dialog windows. The computer system which may be utilized to generate this display is preferably a computer system capable of displaying two or more simultaneously active computer applications which are both input and output active and which are displayed within multiple viewports or windows such as window 22 and window 34. Each window depicted within display screen 16 preferably includes a miniature graphic representation or icon within the title bar of the window. This miniature graphic representation is preferably created and managed in accordance with the method and apparatus set forth in the related patent application referenced above.

Thus, in the manner described therein, miniature graphic representation 24 is displayed within the title bar of window 22 and miniature graphic representation 36 is displayed within the title bar of window 34. In this manner, each computer application which is displayed within computer screen 16 has associated therewith a miniature graphic representation which is unique and which may be utilized to readily identify a particular computer application.

Next, in accordance with an important feature of the present invention, a user dialog window is depicted in association with each computer application. As discussed above, these user dialog windows are preferably substantially identical in an architecture wherein common user dialog windows may be utilized for multiple applications. Thus, user dialog window 26 and user dialog window 38, absent the teaching of the method and apparatus of the present invention, are indistinguishable and there is no known technique for determining which primary application is associated with which user dialog window.

The problem referred to above is solved in accordance with the novel method and apparatus of the present invention by the provision of a miniature graphic representation or icon within each user dialog window which corresponds identically to the miniature graphic representation or icon which is associated with an underlying primary application. Thus, miniature graphic representation 28 within user dialog window 26 may be utilized by the user to readily identify the association between user dialog window 26 and the computer application displayed within window 22. Similarly, miniature graphic representation 40 within user dialog window 38 is an identical copy of miniature graphic representation 36 within the title bar of window 34. In this manner, the association between a user dialog window and its underlying primary application may be readily and efficiently established.

Further, in accordance with an important feature of the present invention, a secondary technique whereby the identity of an underlying primary application for a particular user dialog window may be ascertained is illustrated within FIG. 3. By utilizing a mouse pointer 30, or other similar graphical pointing device, or by utilizing a keyboard, a user may graphically designate miniature graphic representation 28, within user dialog window 26. A textual display 32 is then automatically created in accordance with the method of the present invention in response to this graphic designation. Thus, by graphically designating a miniature graphic representation within a user dialog window the method and apparatus of the present invention may be utilized to create a temporary textual display of the name of the underlying primary application, permitting the user to clearly identify a primary application associated with a user dialog window, despite the fact that application may be obscured within display screen 16. Alternatively, in another embodiment of the present invention, the border or title bar of the underlying primary application may be "flashed" or change color in order to permit the association between that application an a user dialog window to be readily ascertained. Normally a miniature graphic representation, such as miniature graphic representation 28, will be sufficient to permit a user to determine the identity of an underlying primary application; however, if more than one instance of a primary application is active (e.g., two or more charting applications) the miniature graphic representation will not be sufficient. In such instances the textual identification method described above may be utilized in conjunction with additional textual data, such as a data file name, to permit a user to identify a specific associated instance of a primary application.

Figure 4:
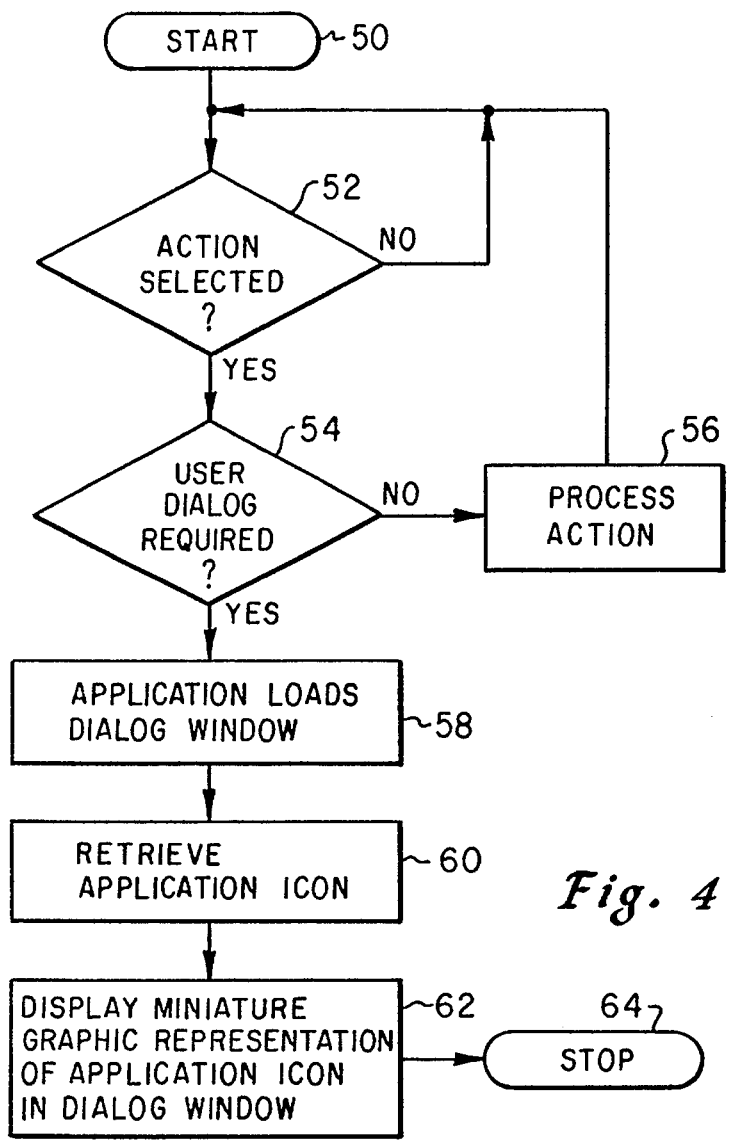
FIG. 4 is a logic flowchart illustrating a method of graphic association of user dialog windows with underlying primary applications in accordance with the present invention.

Referring now to FIG. 4, there is depicted a logic flowchart which illustrates a method of graphic association of user dialog windows with associated primary applications in accordance with the method of the present invention. As illustrated, the process begins at block 50 and thereafter passes to block 52. Block 52 illustrates a determination of whether or not an action has been selected within a particular computer application. If not, the process merely iterates until such time as an action has been selected.

In the event an action has been selected, as determined in block 52, then block 54 illustrates a determination of whether or not a user dialog is required in response to the action selected by the user. If no user dialog is required, the process passes to block 56 which illustrates the processing of the action and the process returns iteratively to block 52.

However, in the event a user dialog is required, as determined in block 54, the process then passes to block 58 which depicts the loading of a dialog window by the primary application. Next, the process passes to block 60 which illustrates the retrieval of the miniature graphic representation or icon associated with the primary application. Finally, the miniature graphic representation or icon associated with the primary application is displayed in an unused space within the associated dialog window, thereby permitting the rapid and efficient association of the dialog window with its underlying primary application. Thereafter the process terminates, as depicted in block 64.

Figure 5:
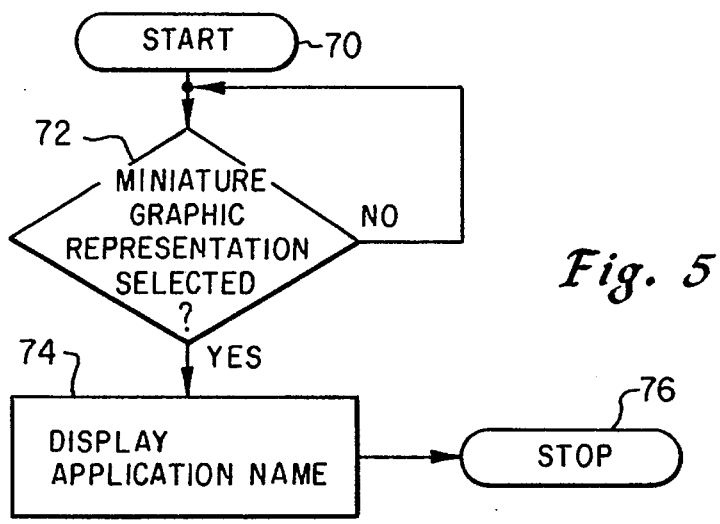
FIG. 5 is a logic flowchart illustrating a method of textual association of user dialog windows in accordance with the present invention.

Finally, with reference to FIG. 5, the method of the present invention whereby a textual identification of a primary application associated with a user dialog window is illustrated. As above, the process begins at block 70 and thereafter passes to block 72 which depicts a determination of whether or not a miniature graphic representation has been graphically selected. If not, the process merely iterates until such time as a selection occurs. Thereafter, in the event a miniature graphics representation has been selected, the process passes to block 74 which illustrates the temporary displaying of the name of the underlying primary application associated with that dialog window. After displaying the application name for a predetermined period of time, or for so long as the miniature graphic representation within the dialog window remains selected, the process then terminates, as illustrated in block 76.

Upon reference to the foregoing those skilled in the art will appreciate that the Applicants in the present application have provided a novel method and apparatus whereby common user dialog windows may be rapidly and efficiently associated with an underlying primary application by utilizing miniature graphic representations displayed within each user dialog window which are associated with a unique miniature graphic representation in an underlying primary application. Further, by graphically selecting such a miniature graphic representation, the user may cause a textual display of the name of the underlying application.

While the invention has been particularly shown and described with reference to a preferred embodiment, it will be understood by those skilled in the art that various changes in form and detail may be made therein without departing from the spirit and scope of the invention.

We claim:

1. A method of managing a computer display system having a graphic pointing device, a plurality of simultaneously active software applications displayed therein and one or more common user dialogs which are displayable within separate windows within said computer display system and wherein each common user dialog may be displayed in association with multiple ones of said plurality of simultaneously active software applications, said method comprising the steps of:

creating a unique miniature graphic representation for each of said plurality of software applications;

displaying said unique miniature graphic representation for a selected software application within a window display of a common user dialog displayed in association with said selected software application in response to a displaying of said common user dialog wherein a user may readily determine which selected software application is associated with said displayed common user dialog upon reference to said unique miniature graphic representation; and displaying a graphic identification of said selected software application in response to a selection of said unique miniature graphic representation utilizing said graphic pointing device.

2. A method for managing a computer display system according to claim 1, wherein said step of displaying a unique miniature graphic representation for a selected software application within a window display of a common user dialog displayed in association with said selected software application in response to a displaying of said common user dialog comprises the step of displaying said miniature graphic representation in a normally unused area of said window display.

3. A method for managing a computer display system according to claim 1, wherein each of said plurality of software applications includes an associated name and wherein said graphic identification of said selected software application comprises a display of said name of said selected software application.

4. A computer system comprising:

a display screen;

a graphic pointing device;

processor means coupled to said display screen for displaying on said display screen a plurality of software applications which are simultaneously active and displayed in a plurality of windows, and one or more common user dialogs which are displayable within separate windows within said display screen wherein each common user dialog may be displayed in association with multiple ones of said plurality of simultaneously active software applications;

graphics generation means for generating a unique miniature graphic representation for each of said plurality of software applications;

means for displaying a unique miniature graphic representation of a selected software application within a window display of a common user dialog displayed in association with said selected software application in response to a displaying of said common user dialog wherein a user each may readily determine which selected software application is associated with said displayed common user dialog upon reference to said unique miniature graphic representation; and means for displaying a graphic identification of said selected software application in response to a selection of said unique miniature graphic representation.

5. A computer system according to claim 4, wherein said processor means comprises a personal computer.

\* \* \* \* \*